US012775593B2

(12) United States Patent
Kawai et al.

(10) Patent No.: US 12,775,593 B2
(45) Date of Patent: Oct. 27, 2026

(54) INFORMATION PROCESSING APPARATUS, INFORMATION PROCESSING METHOD, AND PROGRAM

(71) Applicant: NTT, Inc., Tokyo (JP)

(72) Inventors: Sakiko Kawai, Musashino (JP); Keiichiro Kashiwagi, Musashino (JP); Shoko Katayama, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 19/118,175

(22) PCT Filed: Oct. 25, 2022

(86) PCT No.: PCT/JP2022/039746

§ 371 (c)(1),
(2) Date: Apr. 3, 2025

(87) PCT Pub. No.: WO2024/089768

PCT Pub. Date: May 2, 2024

(65) Prior Publication Data

US 2026/0111398 A1 Apr. 23, 2026

(51) Int. Cl.
*G06F 16/21* (2019.01)
*G06F 16/25* (2019.01)

(52) U.S. Cl.
CPC .......... *G06F 16/211* (2019.01); *G06F 16/258* (2019.01)

(58) Field of Classification Search
CPC ............................ G06F 16/211; G06F 16/258
USPC .......................................................... 707/803
See application file for complete search history.

(56) References Cited

U.S. PATENT DOCUMENTS

2003/0041227 A1* 2/2003 Nakamatsu ............. G06F 16/27 707/E17.005
2008/0253283 A1* 10/2008 Douglis .............. H04L 67/1036 370/228
2023/0185584 A1* 6/2023 Casalino .............. G06F 16/958 713/1

OTHER PUBLICATIONS

[No Author Listed], “Governing information with InfoSphere Information Governance Catalog,” InfoSphere Information Governance Catalog Version 11, Release 3, 2014, 57 pages (with machine translation).

(Continued)

*Primary Examiner* — Baoquoc N To
(74) *Attorney, Agent, or Firm* — Fish & Richardson P.C.

(57) ABSTRACT

A module generation basis includes: a data catalog configured to retain schema information of data as a catalog; a function catalog configured to retain input/output information of functions as a catalog; a management unit configured to manage a data conversion module that outputs data in a format indicated by the schema information of the data, a function conversion module that inputs the data in a format indicated by the input/output information of the function and substitutes the data into arguments of the function, and a mapping module that maps data obtained from an output of the data conversion module to each of the arguments of the function and outputs the data in a format indicated by the input/output information of the function; and a flow generation unit that supports generation of a flow in which the data conversion module, the function conversion module, and the mapping module are connected.

9 Claims, 15 Drawing Sheets

(56) References Cited

OTHER PUBLICATIONS

Atlas.apache.org [online], “Data Governance and Metadata framework for Hadoop,” available on or before Mar. 2023, retrieved on Mar. 2025, retrieved from URL<https://atlas.apache.org/2.2.0/index.html#/>, 3 pages.

Oomura et al., “A next-generation data hub that makes data utilization safe and convenient across organizations” NTT Technology Journal, Feb. 2022, 34(2):9-13 (with machine translation).

* cited by examiner

Fig. 4

DATA NAME: sales.csv
DATA DESCRIPTION: Product Pricing Information
DATA OWNER: A Company
CREATION DATE: 2022/1/1 12:00:00
KEY: {"item_code", "selling_price"}
TYPE: {char, int}
UNIT: {none, Dollar}
DESCRIPTION: {Product No., Selling price}

METADATA OF DATA

Fig. 5

Sales

```
module.exports = function(RED) {
  function SalesNode(config) {
    RED.nodes.createNode(this, config);
    var node = this;
    node.on( 'input' , function(msg) {
      csv_data = SANDBOX_DATA_READ("sales.csv");
      msg.item_code = csv_data.col0;
      msg.selling_price = csv_data.col1;
      node.send(msg);
    });
  }
  RED.nodes.registerType("sales", SalesNode);
}
```

DATA CONVERSION MODULE

FUNCTION

Fig. 8

FUNCTION NAME: sum
FUNCTION DESCRIPTION: Function to return sales if 100 units of a product are sold.
FUNCTION OWNER: B Company
CREATION DATE: 2022/2/2 12:00:00
ARGUMENT DESCRIPTION: The object to be multiplied by 100 is the first argument.
FUNCTION ARGUMENT
    KEY: {"num1"}
    TYPE: {int}
    UNIT: {YEN}
    DESCRIPTION: {Product price}
OUTPUT
    TYPE: int
    UNIT: YEN
    DESCRIPTION: Sales if 100 units are sold.

METADATA OF FUNCTION

Fig. 9

Sum

```
module.exports = function(RED) {
  function SumNode(config) {
    RED.nodes.createNode(this, config);
    var node = this;
    node.on( 'input' , function(msg) {
      SANDBOX_LOGIC_CALL("sum", msg.num1);
    });
  }
  RED.nodes.registerType("sum", SumNode);
}
```

FUNCTION CONVERSION MODULE

MAPPING MODULE

INFORMATION PROCESSING APPARATUS, INFORMATION PROCESSING METHOD, AND PROGRAM

CROSS-REFERENCE TO RELATED APPLICATIONS

This application is a National Stage application under 35 U.S.C. § 371 of International Application No. PCT/JP2022/039746, having an International Filing Date of Oct. 25, 2022. The disclosure of the prior application is considered part of the disclosure of this application, and is incorporated by reference in its entirety into this application.

TECHNICAL FIELD

The present invention relates to an information processing device, an information processing method, and a program.

BACKGROUND ART

In order to solve social problems such as realization of resource recycling societies, cooperation between a multiple companies is becoming more active, and inter-organization data distribution for supporting cooperation has also started. In order to make data distribution efficient, there is a product for cataloguing schema information (data model) of data (NPL 1).

In addition to data distribution, creating new business and solving social problems by distributing functions (also referred to as data processing algorithms and data processing modules) for processing data and combining the data and functions can be expected.

However, for sensitive data such as business secrets and the like of each organization and closed functions with know-how, there is concern of unexpected use and outflow of provided data and functions.

A data sandbox technique has been proposed as a technique for technically eliminating the foregoing concern. The data sandbox technique is a technique capable of using data and functions mutually without disclosing the data and the functions. Specifically, in the data sandbox technique, a data sandbox which is an execution environment isolated from the outside is generated, data and functions are encrypted and disposed in the data sandbox, and the data are processed by the functions after the encryption is released in the data sandbox. After a processing result is first disclosed to a disclosure destination agreed between a data provider and a function provider, the data sandbox is deleted along with the data and the functions. Accordingly, a result obtained by processing the data by the function can be obtained with the data and the functions concealed.

CITATION LIST

Non Patent Literature

[NPL 1] "Apache Atlas—Data Governance and Metadata framework for Hadoop", Internet <URL:https://atlas.apache.org/#/>

SUMMARY OF INVENTION

Technical Problem

In order to combine data managed by different management entities with functions, it is necessary for data profit users to ascertain information regarding data, ascertain information regarding functions, and convert formats of data in accordance with the functions.

There is a product (NPL 1) for cataloguing schema information of data, but it is not established that information regarding functions (for example, information regarding arguments and outputs) can be catalogued and handled, and it is not easy to connect data of different management entities with functions.

The present invention has been devised in view of the foregoing circumstances, and an object of the present invention is to facilitate effective use of functions and data of different management entities.

Solution to Problem

According to an aspect of the present invention, an information processing device includes: a data catalog configured to retain schema information of one or more pieces of data as a catalog; a function catalog configured to retain input/output information of one or more functions as a catalog; a management unit configured to manage a data conversion module that outputs the data in a format indicated by the schema information of the data, a function conversion module that inputs the data in a format indicated by the input/output information of the function and substitutes the data into arguments of the function, and a mapping module that maps data obtained from an output of the data conversion module to each of the arguments of the function and outputs the data in a format indicated by the input/output information of the function.

Advantageous Effects of Invention

According to the present invention, it is possible to facilitate effective use of functions and data of different management entities.

BRIEF DESCRIPTION OF DRAWINGS

FIG. 4 is a diagram illustrating an example of metadata of the data in FIG. 3.

FIG. 5 is a diagram illustrating an example of a data conversion model that converts the data in FIG. 3.

FIG. 8 is a diagram illustrating an example of metadata of the function in FIG. 7.

FIG. 9 is a diagram illustrating an example of a function conversion module of FIG. 7.

DESCRIPTION OF EMBODIMENTS

Hereinafter, an embodiment of the present invention will be described with reference to the drawings.

Figure 1:
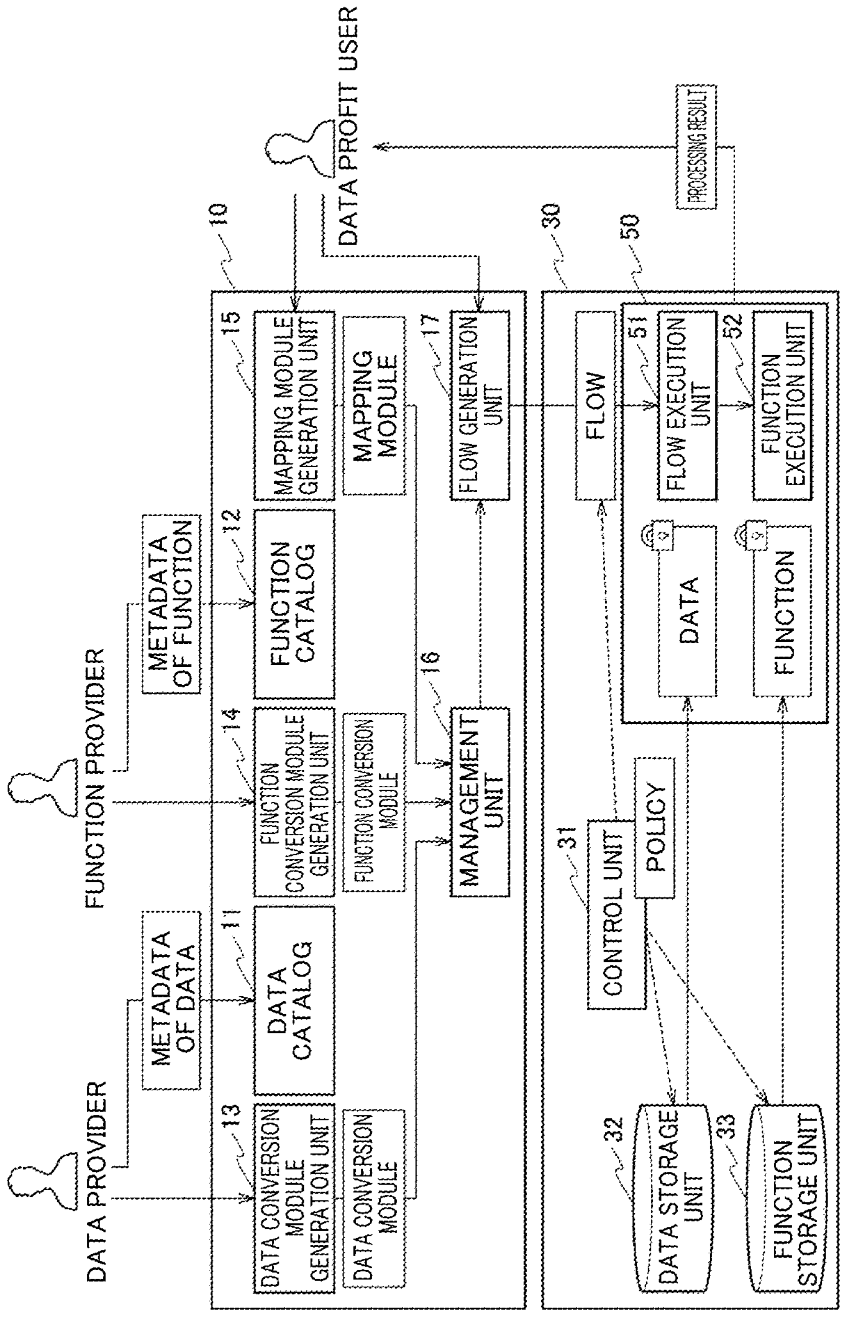
FIG. 1 is a diagram illustrating an example of a configuration of data profit using system according to an embodiment.

FIG. 1 is a diagram illustrating an example of a configuration of a data profit using system according to the embodiment. The data profit using system illustrated in FIG. 1 includes a module generation basis 10 and a processing basis 30.

The data provider stores provided data in a data storage unit 32 of the processing basis 30, and stores metadata of the data in a data catalog 11 of the module generation basis 10. Further, the data provider uses the module generation basis 10 to generate a data conversion module that uses data for the processing basis 30. Details of the metadata and the data conversion module will be described below.

The function provider stores provided functions in the function storage unit 33 of the processing basis 30 and stores the metadata of the functions in the function catalog 12 of the module generation basis 10. Further, the function provider uses the module generation basis 10 to generate a function conversion module that uses the functions for the processing basis 30. Details of the metadata and function conversion module will be described below.

The data profit user retrieves data and functions desired to be combined from the data catalog 11 and the function catalog 12. The data profit user generates a mapping module that maps the data to arguments of the functions with reference to the metadata of the data and the metadata of the functions. The data profit user generates a flow by connecting the data conversion module, the function conversion module, and the mapping module. The flow is a flow of processing to be executed in the processing basis 30.

Before the flow in the processing basis 30 is executed, the data profit user proposes a policy describing that the data profit user uses the data and the function and the data profit user acquires a result obtained by combining the data and the function to the data provider and the function provider. The policy agreement is made among the data provider, the function provider, and the data profit user. The data profit user may be the same as the data provider or the function provider. That is, the data provider may process the own data using a function of another person, or the function provider may process data of the other person for the own function. When the data profit user is the same as the data provider or the function provider, the agreement of the policy is made between the data provider and the function provider.

When the data profit user inputs the flow to the processing basis 30, a data sandbox 50 for executing the flow is generated. After the data and the functions are read into the data sandbox 50 and are converted in accordance with the policy and the flow, the data is processed with the functions and a processing result is output. After the processing, the data sandbox 50 is deleted along with the read data and the functions. Hereinafter, each unit of the module generation basis 10 and the processing basis 30 will be described.

The module generation basis 10 includes a data catalog 11, a function catalog 12, a data conversion module generation unit 13, a function conversion module generation unit 14, a mapping module generation unit 15, a management unit 16, and a flow generation unit 17.

The data catalog 11 retains metadata related to data provided by the data provider as a catalog. The data catalog 11 stores schema information of data in addition to general metadata. The schema information is information for defining a data structure. In the embodiment, as the schema information, for each item of data, a data model that retains a key, a type, a unit and a meaning is stored. The data provided by the data provider is described in a Key-Value format or can be converted into the Key-Value format.

The function catalog 12 retains metadata related to the functions provided by the function provider as a catalog. The function catalog 12 stores input/output information regarding arguments and outputs of the functions in addition to general metadata. The information regarding the arguments is unified in the same format as the schema information of the data. Specifically, the function catalog 12 stores a data model that retains a key, a type, a unit, and a meaning for each argument. The input/output information has names of the keys of the arguments and the order information of the keys (arguments). For example, for the input keys, "num1", "num2", . . . , indicating the order of arguments are given. The function catalog 12 stores the data model that retains a type, a unit and a meaning with respect to the information regarding the output. The information regarding the output may include a key (for example, an "output") for acquiring the processing result.

By disclosing and managing the same items in the schema information of the data and the input/output information of the functions, an interface for connecting both the schema information and the input/output information can be ascertained, and connection becomes easy.

The data conversion module generation unit 13 supports generation of a data conversion module. The data conversion module is a program that can obtain data in a format indicated by the metadata stored in the data catalog 11. In the embodiment, the interface between the modules is defined with an msg object, and the data conversion module matches the interface so that a value of data can be acquired from the msg object with a key. When a key is designated in the output of the data conversion module, data corresponding to the key can be obtained. For example, if the key is "price", a value of data corresponding to "price" can be obtained with "msg.price". Also, when "msg.sales quantity" and another key "sales quantity" are designated, a value of data corresponding to "sales quantity" can be obtained.

The function conversion module generation unit 14 supports generation of a function conversion module. The function conversion module is a program that inputs data in the format indicated by the metadata stored in the function catalog 12 and substitutes the data into an argument of the function. In the embodiment, the function variable module designates a key for the msg object and acquires the value of data, and substitutes the acquired value into the argument of the function corresponding to the key. For example, when the function conversion module inputs a value designated with the keys of "num1" and "num2", the function conversion module substitutes a value acquired with "msg.num1" into a first argument of the function and substitutes a value acquired with "msg.num2" into a second argument of the function. The metadata of the function catalog 12 indicates that values obtained by the key "num1" and the key "num2" are substituted into the first and second arguments of the function, respectively.

The mapping module generation unit 15 supports generation of a mapping module. The mapping module is a program that maps the value of data obtained from an output of the data conversion module to each of the arguments of the function. For example, when the values of the data can be acquired from an output of the data conversion module with the key "price" and the key "sales quantity" and the function conversion module substitutes the values obtained with the key "num1" and the key "num2" into the first and second arguments of the function, respectively, the mapping module inputs the output of the data conversion module, inserts the value acquired with the key "price" to the value of the key "num1", and inserts the value acquired with the key "sales quantity" to the value of the key "num2". By inputting the output of the mapping module to the function conversion module, the value acquired by the key "price" is substituted into the first argument of the function and the value acquired by the key "sales quantity" is substituted into the second argument. The data profit user generates the mapping module that maps the data to each of the arguments of the function with reference to the data catalog 11 and the function catalog 12.

If necessary, the mapping module converts the value of the data in accordance with the unit or the type of the argument of the function. For example, when the unit of the data is kg and the unit of the function argument is g, the mapping module converts the value of the data from kg to g. When a date is a character type in the data and the function inputs the date as a numerical value, the mapping module converts the value of the data from the character type to a numerical value.

For example, the data conversion module generation unit 13, the function conversion module generation unit 14, and the mapping module generation unit 15 provide an editor function of inputting each module or provide a function of reading each module from an external tool. Alternatively, the data conversion module generation unit 13 may generate the data conversion module based on the schema information of the data, and the function conversion module generation unit 14 may generate the function conversion module based on the input/output information of the function. The mapping module generation unit 15 may generate the mapping module based on the schema information of the data and the input/output information of the function. For example, the mapping module generation unit 15 extracts the data having the same type and meaning and the arguments of functions and maps the extracted data to the extracted arguments of functions with reference to the schema information of data and the input/output information of functions. The mapping module generation unit 15 adds a function of converting a unit or a type to the mapping module if conversion of the unit or the type is necessary. The mapping module may perform conversion other than the conversion of the unit and the type.

The management unit 16 retains and manages the data conversion module, the function conversion module, and the mapping module. For example, the management unit 16 may associate the metadata of the data with the data conversion module and associate the metadata of the function with the function conversion module to manage them. When the data profit user retrieves the data and the function with reference to the data catalog 11 and the function catalog 12, the data profit user acquires the data conversion module and the function conversion module using the data and the function from the management unit 16, and generates a mapping module connecting the data conversion module to the function conversion module.

The flow generation unit 17 supports generation of a flow in which each module is connected. The data profit user generates the flow by connecting an output of the module to an input of another module. For example, Node-RED can be used for the flow generation unit 17. Node-RED is a tool that drags and drops various nodes to a workspace and connects the nodes by lines to develop an application. In the embodiment, each module is generated as a node of the Node-RED and the nodes are connected to form a flow by Node-RED.

When the data profit user disposes the flow in the processing basis 30, the processing basis 30 processes the data with the function in accordance with the flow and outputs a processing result.

The processing basis 30 includes a control unit 31, a data storage unit 32, a function storage unit 33, and a data sandbox 50.

The control unit 31 controls execution of the flow in the processing basis 30 in accordance with the policy agreed in advance among the data provider, the function provider and the data profit user. Specifically, after the policy is confirmed, the control unit 31 inputs a flow, generates the data sandbox 50, reads the data and function necessary in order to execute the flow from the data storage unit 32 and the function storage unit 33, disposes the data and the function in the data sandbox 50, and executes the flow in the data sandbox 50.

The control unit 31 retains a policy related to use of the data and the function and determines whether the use of the data and the function by the data profit user follows the policy. When the use of the data and the function follows the policy, the control unit 31 executes the flow and returns a processing result to the data profit user. The policy is a use condition of the data and the function by the data profit user. The policy related to the use of the data and the function is agreed among the data provider, the function provider, and the data profit user. According to the policy, a use range of the data is determined, a use condition of the function is determined, and a use range of the processing result obtained by multiplying the data and the function is determined. Examples of the use range of the data includes an item of available data, a person who can use the data, a period in which the data is available, and the number of times the data is available. Examples of the use condition of the function include a function of an available function, an amount of data that can be processed by the function, a person who can use the function, a period in which the function is available, and the number of times the function is available. Examples of the use range of the processing result include a person who can use the processing result, a period in which the processing result can be used, and the number of times the processing result can be used.

The data storage unit 32 stores data provided by the data provider. According to the policy, access to the data stored in the data storage unit 32 by a provider other than the data provider is restricted. The data storage unit 32 may encrypt and store the data.

The function storage unit 33 stores functions provided by the function provider. According to the policy, access to the functions stored in the function storage unit 33 by a provider other than the function provider is restricted. The function storage unit 33 may encrypt and store the functions.

The data and the functions are encrypted and disposed in the data sandbox 50. The data may be acquired from a location other than the data storage unit 32 and disposed in the data sandbox 50, the functions may be acquired from a location other than the function storage unit 33 and disposed in the data sandbox 50.

The data sandbox 50 is an execution environment isolated from the outside, is generated for each flow, and is deleted after processing of the flow. The data sandbox 50 includes a flow execution unit 51 and a function execution unit 52. The flow execution unit 51 executes the module according to the flow. The function execution unit 52 executes a function by substituting the data into an argument. The data and the functions are decoded and processed in a Trusted Execution Environment (TEE). The TEE is an area in a central processing unit (CPU) provided by, for example, the CPU. The data sandbox 50 is deleted after the processing result is returned to the data profit user.

Figure 2:
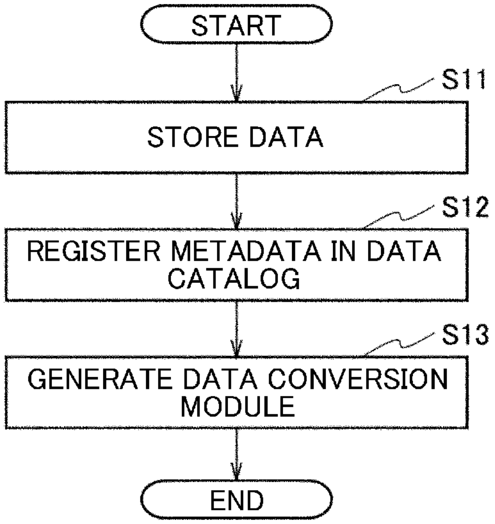
FIG. 2 is a flowchart illustrating an example of a flow of processing in which a data provider provides data.

Next, an example of a flow of processing in which the data provider provides the data will be described with reference to the flowchart of FIG. 2.

Figure 3:
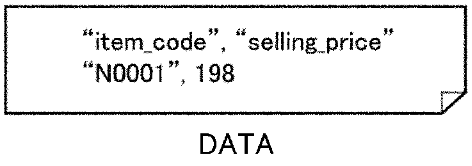
FIG. 3 is a diagram illustrating an example of data.

In step S11, the data provider stores the data that is provided in a data storage unit 32. The data provider may register a storage location of the data in the processing basis 30 instead of a data body. FIG. 3 is a diagram illustrating an example of data. The data in FIG. 3 is data including a product number (item_code) and a selling price (selling_price).

In step S12, the data provider registers metadata of the data that is provided in the data catalog 11. FIG. 4 is a diagram illustrating an example of the metadata of the data in FIG. 3. The metadata may include a data model that retains a key, a type, a unit, and a meaning for each piece of the data, in addition to general metadata. Specifically, the metadata in FIG. 4 includes a name of the data, a description of the data, an owner of the data, and a generation date as the general metadata. The schema information of the data includes a data model in which a key is an "item_code", a type is a character type, and there is no unit for data of a commodity number and a data model in which a key is "selling_price", a type is an integer type, and a unit is a dollar for data of a sales price.

In step S13, the data provider generates the data conversion module that obtains a value from a key using the data conversion module generation unit 13. The generated data conversion module is managed by the management unit 16 in association with the metadata of the data catalog 11. FIG. 5 is a diagram illustrating an example of the data conversion module. The data conversion module in FIG. 5 reads the data in FIG. 3 in the data sandbox 50, substitutes a read value into each of a variable corresponding to the key of "item_code" and a variable corresponding to the key of "selling_price" and outputs a message for obtaining the value of data with each of the keys. Hereinafter, the data conversion module in FIG. 5 is also referred to as a Sales node.

Figure 6:
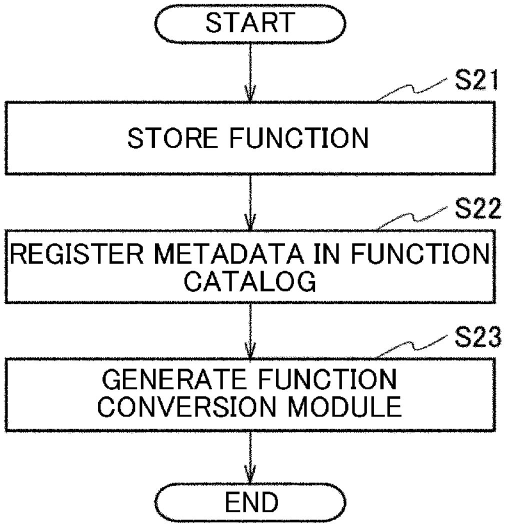
FIG. 6 is a flowchart illustrating an example of a flow of processing providing a function.

Next, an example of a flow of processing in which the function provider provides a function will be described with reference to the flowchart of FIG. 6.

Figure 7:
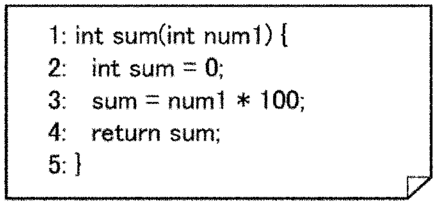
FIG. 7 is a diagram illustrating an example of a function.

In step S21, the function provider stores a function that is provided in the function storage unit 33. The function provider may register a storage location of the function in the processing basis 30 instead of a function body. FIG. 7 is a diagram illustrating an example of the function. The function in FIG. 7 is a function of calculating a sales amount when a commodity is sold in 100 units.

In step S22, the function provider registers metadata of the function that is provided in the function catalog 12. FIG. 8 is a diagram illustrating an example of the metadata of the function in FIG. 7. The metadata includes input/output information regarding the argument and an output of the function in addition to general metadata. Specifically, the metadata in FIG. 8 includes a name of the function, a description of the function, an owner of the function, a generation date, and input/output information of the function. The input/output information of the function includes information regarding arguments indicating that a key is a "num1", a type is an integer type, and a unit is a yen price of a commodity and information regarding an output indicating that a type is an integer type and that sales is output when a commodity of which a unit is yen is sold in 100 units.

In step S23, the function provider generates a function conversion module that inputs data to the arguments and executes processing by a function using the function conversion module generation unit 14. The generated function conversion module is managed by the management unit 16 in association with the metadata of the function catalog 12. FIG. 9 is a diagram illustrating an example of the function conversion module. The function conversion module in FIG. 9 substitutes a value obtained with the key of "num1" in the input message into the first argument in the data sandbox 50, and calls the function in FIG. 7. Hereinafter, the function conversion module in FIG. 9 is also referred to as a Sum node.

Figure 10:
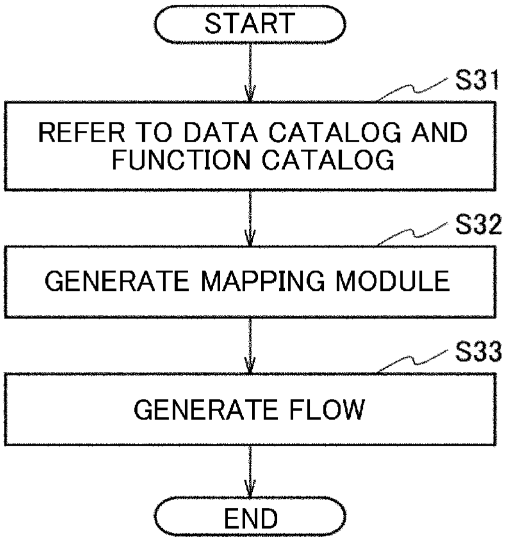
FIG. 10 is a flowchart illustrating an example of a flow of processing in which a data profit user uses data and functions.

Next, an example of a flow of processing in which the data profit user uses data and functions will be described with reference to the flowchart of FIG. 10.

In step S31, the data profit user retrieves data and a function desired to be used with reference to the data catalog 11 and the function catalog 12. When the data profit user is the same as the data provider, a function of processing the own data is retrieved from the function catalog 12. When the data profit user is the same as the function provider, data to be processed by the own function is retrieved from the data catalog 11.

In step S32, the data profit user generates the mapping module that maps the data to the argument of the function using the mapping module generation unit 15 with reference to the metadata of the data provided by the data catalog 11 and the metadata of the function provided by the function catalog 12. The mapping module is managed by the management unit 16.

Figure 11:
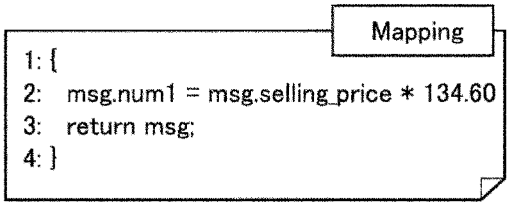
FIG. 11 is a diagram illustrating an example of a mapping module.

For example, the data profit user knows that a commodity number and a selling price can be obtained using the key "item_code" and the key "selling_price" and a unit of a value obtained using the key "selling_price" is a dollar from an output of the Sales node with reference to the metadata in FIG. 4, and knows that a Sum node is a node in which a value obtained with the key "num1" is substituted into an argument of the function, a unit of the value obtained with the key "num1" is yen, and a unit of an output of a Sum node is yen with reference to the metadata in FIG. 8. The data profit user generates the mapping module that maps information obtained from the output of the Sales node to the argument of the function based on the obtained information. FIG. 11 is a diagram illustrating an example of the mapping module. The mapping module in FIG. 11 is a module that maps the output of the Sales node in FIG. 5 to the argument of the function of the Sum node in FIG. 9. Specifically, the mapping module in FIG. 1 is a module that obtains a value corresponding to the key "selling_price" from the output of the Sales node, converts a unit of the obtained value into a unit of the input of the Sum node, and outputs a message obtained by substituting the converted value into a variable indicated by the key "num1". Hereinafter, the mapping module in FIG. 10 is also referred to as a Mapping node.

Figure 12:
FIG. 12 is a diagram illustrating an example of a flow.

In step S33, the data profit user connects various modules using the flow generation unit 17, and generates a flow for processing data with the function in the processing basis 30. FIG. 12 is a diagram illustrating an example of the flow. In the flow of FIG. 12, the Sales node and the Sum node are connected via the Mapping node. By executing this flow, the output of the Sales node is processed by the Mapping node and inputted to the Sum node. Specifically, the Sales node reads data and substitutes a value of the data into a variable indicated by the key "selling_price". The Mapping node acquires a value from the variable indicated by the key "selling_price", converts a unit dollar of the acquired value into yen, and substitutes the converted value into a variable indicated by the key "num1". The Sum node acquires a value from the variable indicated by the key "num1" and substitutes the acquired value into an argument to execute a function.

Since the schema information of the data and input/output information of the function are catalogued in a unified format including a key, a type, a unit and a meaning in the data catalog 11 and the function catalog 12, the data profit user can retrieve desired data and a function capable of processing the data and can easily connect the data and the function.

Figure 13:
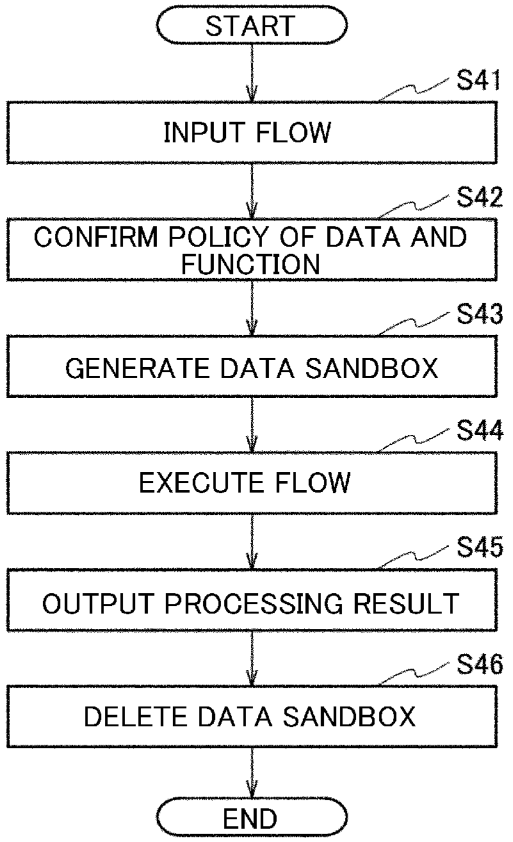
FIG. 13 is a diagram illustrating an example of a flow of processing of a processing basis.

Next, an example of a flow of processing by the processing basis 30 will be described with reference to the flowchart of FIG. 13.

In step S41, the processing basis 30 inputs a flow and a module.

In step S42, the control unit 31 determines whether the use of the data and the function of the flow follows the policy. For example, the control unit 31 extracts the data and the function that is used in the flow and determines whether the data profit user retains a right to use the data and the function. When the use of the flow data and the function does not follow the policy, the processing basis 30 does not execute subsequent processing. The control unit 31 may notify that the use of the data and the function in the flow does not follow the policy.

In step S43, the control unit 31 generates the data sandbox 50 that executes the flow, acquires the data and the function according to the policy, and disposes the data and the function in the data sandbox 50. In the data sandbox 50, the encrypted data and the encrypted function are disposed.

In step S44, the data sandbox 50 executes each module according to the flow. For example, the flow execution unit 51 executes the module according to the flow, the function execution unit 52 decodes the data and the function in the CPU according to the execution of the module and processes the data by the function.

In step S45, the data sandbox 50 outputs a processing result obtained by the execution of the flow.

In step S46, the control unit 31 deletes the data sandbox 50 along with the data and the function.

Through the foregoing processing, only the processing result obtained by processing the data with the function can be obtained without viewing the data and the function.

In the embodiment, the processing basis 30 that processes the data and the function in the data sandbox 50 with the data and the functions concealed is used, but the present invention is not limited thereto. For example, the data profit user may process the data with the function on the own computer using the flow generated by the module generation basis 10. It is assumed that, in the data and the function, the policy which may be used by the computer of the data profit user is set.

Figure 14:
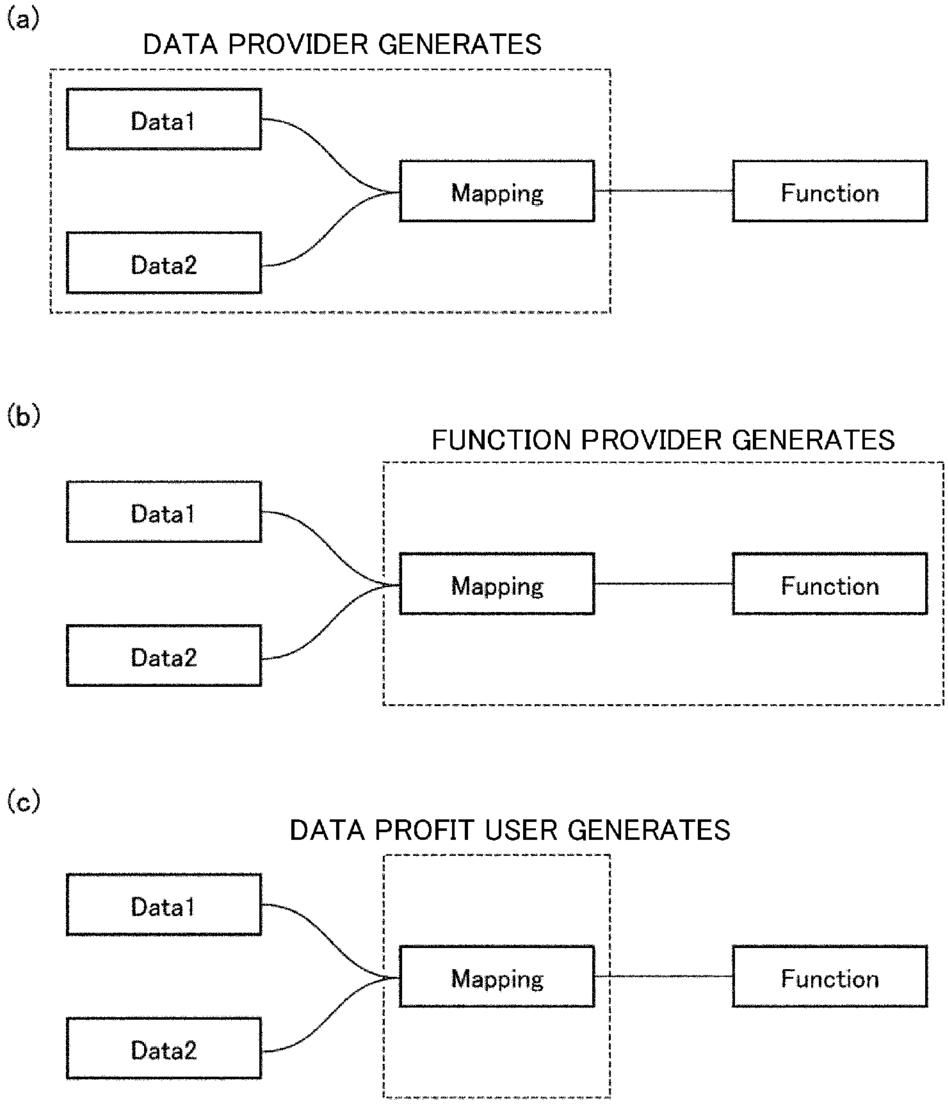
FIG. 14 is a diagram illustrating a variation of a module generator.

Further, although the embodiment has been described with reference to an example in which the data profit user generates the mapping module, the data provider may generate the data conversion module and the mapping module, as illustrated in FIG. 14(*a*), and the function provider may generate the function conversion module and the mapping module, as illustrated in FIG. 14(*b*). In the example in FIG. 14(*a*), the data provider generates a Data1 node and a Data2 node in order to process the own data with the function of another person and generates the Mapping node that maps outputs of the Data node and the Data2 node to the argument of the Function node with reference to the function catalog 12. In an example of FIG. 14(*b*), the function provider generates a Function node in order to process the data of another person with the own function, and generates a Mapping node that maps the outputs of the Data1 node and the Data2 node to the argument of the Function node with reference to the data catalog 11.

FIG. 14(*c*) is a diagram illustrating an example in which the data profit user who is not the data provider or the function provider generates the mapping module. The Data1 node and the Data2 node are generated by the data provider. The Function node is generated by the function provider. The data profit user generates the Mapping node that maps the outputs of the Data1 node and the Data2 node to the arguments of the Function node with reference to the data catalog 11 and the function catalog 12.

As described above, the module generation basis 10 according to the embodiment includes the data catalog 11 that retains the schema information of data as a catalog; the function catalog 12 that retains input/output information of a function as a catalog; the management unit 16 that manages a data conversion module outputting data in a format indicated by the schema information of the data, a function conversion module inputting data in a form indicated by input/output information of a function and substituting the data into an argument of the function and a mapping module mapping data obtained from an output of the data conversion module to each argument of the function and outputting the data in a form indicated by the input/output information of the function, and the flow generation unit 17 that supports generation of a flow in which the data conversion module, the function conversion module and the mapping module are connected. Accordingly, the data profit user can retrieve desired data and desired functions from the data catalog 11 and the function catalog 12 and multiply the data and the functions for use.

According to the embodiment, the schema information of the data and the input/output information of the function are unified in the same format, and the schema information of the data includes a key, a type, a unit, and a meaning for each piece of data, the input/output information of the function includes a key, a type, a unit, and a meaning for each argument of the function, and inputs of the data and the function are easily connected.

Figure 15:
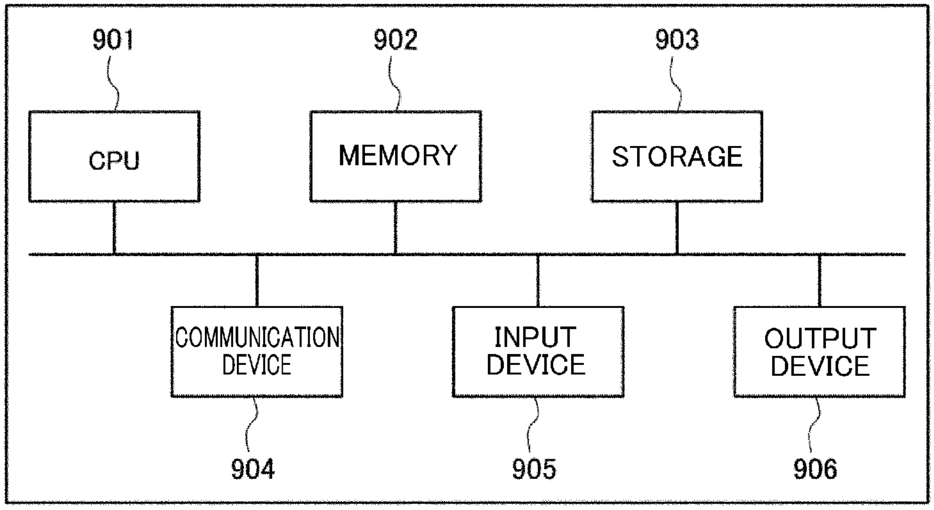
FIG. 15 is a diagram illustrating an example of a hardware configuration of a module generation basis and a processing basis.

For the module generation basis 10 and the processing basis 30 described above, for example, a general-purpose computer system that includes a CPU 901, a memory 902, a storage 903, a communication device 904, an input device 905, and an output device 906 can be used, as illustrated in FIG. 15. In the computer system, the module generation basis 10 and the processing basis 30 are realized by causing the CPU 901 to execute a predetermined program loaded on the memory 902. This program can be recorded on a computer-readable non-transitory recording medium such as a magnetic disk, an optical disc, or a semiconductor memory or can be distributed via a network. The module generation basis 10 and the processing basis 30 may be configured with a plurality of computers or a virtual machine on a cloud. The communication device 904, the input device 905, and the output device 906 may also be configured with a plurality of computers or a virtual machine on a cloud.

REFERENCE SIGNS LIST

10 Module generation basis
11 Data catalog
12 Function catalog

13 Data conversion module generation unit
14 Function conversion module generation unit
15 Mapping module generation unit
16 Management unit
17 Flow generation unit
30 Processing basis
31 Control unit
32 Data storage unit
33 Function storage unit
50 Data sandbox
51 Execution unit
52 Function execution unit

The invention claimed is:

1. An information processing device comprising:

a data catalog, including one or more processors, configured to retain schema information of data as a first catalog;

a function catalog, including one or more processors, configured to retain input/output information of one or more functions as a second catalog;

a data conversion module, including one or more processors, that is configured to output the data in a format indicated by the schema information of the data;

a function conversion module, including one or more processors, configured to input the data in a format indicated by the input/output information of the one or more functions and substitute the data into arguments of the one or more functions; and a mapping module, including one or more processors, configured to:

generate mapping data that associates the schema information of the data stored in the first catalog and the input/output information of the one or more functions stored in the second catalog;

map data obtained from an output of the data conversion module to each of the arguments of the one or more functions using the generated mapping data; and output the mapped data in a format indicated by the input/output information of the one or more functions.

2. The information processing device according to claim 1, further comprising a flow generation unit, including one or more processors, configured to support generation of processing in which the data conversion module, the function conversion module, and the mapping module are connected.

3. The information processing device according to claim 1, wherein the schema information of the data includes a key, a type, a unit, and a meaning, and wherein the input/output information of the one or more functions includes a key, a type, a unit, and a meaning for each of the arguments of the function.

4. The information processing device according to claim 3, wherein the data conversion module is configured to store a value of the data in a variable from which a value is acquirable with a key of the data, wherein the mapping module is configured to acquire a value of the data by designating a key of the data in an output of the data conversion module, and store the value of the data in a variable from which a value is acquirable with a key of an argument of the function, and wherein the function conversion module is configured to acquire the value of the data by designating a key of the argument of the one or more functions in the output of the mapping module, and substitute the acquired value of the data into the argument of the one or more functions.

5. The information processing device according to claim 4, wherein the mapping module is configured to convert the value of the data acquired from the output of the data conversion module in accordance with the unit or type of the argument of the one or more functions.

6. The information processing device according to claim 4, further comprising a processing unit configured to:

input processing in which the data conversion module, the function conversion module, and the mapping module are connected;

generate an execution environment for executing the processing;

dispose the data and the function inside the execution environment;

process the data by the function in accordance with the processing; and delete the execution environment along with the data and the function after execution of the processing.

7. The information processing device of claim 1, wherein the mapping module is further configured to generate the mapping data by identifying an association between at least one of a key, type, unit, or meaning included in the schema information stored in the first catalog and at least one of a key, type, unit, or meaning included in the input/output information stored in the second catalog.

8. An information processing method in which a computer is caused to execute:

retaining schema information of data as a first catalog;

retaining input/output information of one or more functions as a second catalog;

outputting the data in a format indicated by the schema information of the data;

inputting the data in a format indicated by the input/output information of the one or more functions and substitute the data into arguments of the one or more functions;

generating mapping data that associates the schema information of the data stored in the first catalog and the input/output information of the one or more functions stored in the second catalog;

mapping data obtained from the output data to each of the arguments of the one or more functions using the generated mapping data; and outputting the mapped data in a format indicated by the input/output information of the one or more functions.

9. One or more non-transitory computer-readable media that store instructions which, when executed by one or more computer processors, cause the one or more computer processors to perform operations comprising:

retaining schema information of data as a first catalog;

retaining input/output information of one or more functions as a second catalog;

outputting the data in a format indicated by the schema information of the data;

inputting the data in a format indicated by the input/output information of the one or more functions and substitute the data into arguments of the one or more functions;

generating mapping data that associates the schema information of the data stored in the first catalog and the input/output information of the one or more functions stored in the second catalog;

mapping data obtained from the output data to each of the arguments of the one or more functions using the generated mapping data; and outputting the mapped data in a format indicated by the input/output information of the one or more functions.

* * * * *